July 29, 1924.

M. HEDGLON

SHAFT COUPLING

Filed July 24, 1922

1,503,446

INVENTOR
Mead Hedglon

BY
Howard P. Denison
ATTORNEY

Patented July 29, 1924.

1,503,446

UNITED STATES PATENT OFFICE.

MEAD HEDGLON, OF SYRACUSE, NEW YORK, ASSIGNOR TO SYRACUSE WASHING MACHINE CORPORATION, OF SYRACUSE, NEW YORK, A CORPORATION OF NEW YORK.

SHAFT COUPLING.

Application filed July 24, 1922. Serial No. 577,093.

*To all whom it may concern:*

Be it known that I, MEAD HEDGLON, of Syracuse, in the county of Onondaga, in the State of New York, have invented new and useful Improvements in Shaft Couplings, of which the following, taken in connection with the accompanying drawings, is a full, clear, and exact description.

This invention relates to a shaft coupling of the friction clutch type adapted to be used more particulary as a part of the driving connections between the motor and washing or wringing mechanism of power-driven clothes washing machines, the object being to prevent overloading and consequent stalling or burning out of the motor by allowing the driving shaft section to slip relatively to the driven section in case the resistance to movement of the washer or wringer mechanism is excessive.

Another object is to provide simple and efficient means for adjusting at will the friction between the driving and driven elements so as to vary the slipping moment for motors of different powers and for different loads.

A further object is to assemble the coupling sections in such manner as to entirely enclose the frictionally engaged elements and spring for producing the desired friction between those elements.

Another object is to provide simple and efficient means for locking the relatively adjustable coupling sections in their adjusted positions.

Other objects and uses relating to specific parts of the device will be brought out in the following description:

Figure 1:
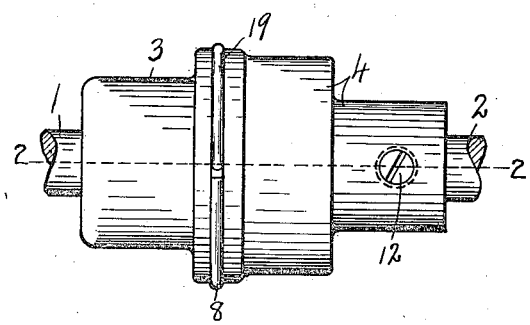
Figure 1 is a plan view of a coupling section embodying the various features of my invention, together with the adjacent ends of the driving and driven shafts coupled together thereby.
Figure 2:
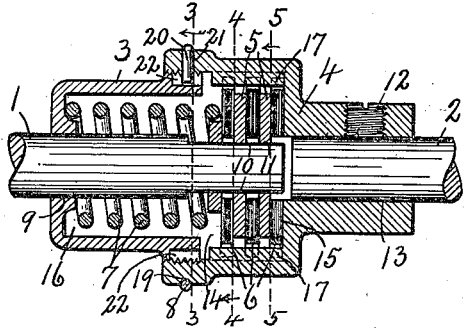
Figure 2 is a longitudinal sectional view of the same coupling taken on line 2—2, Figure 1.
Figure 3:
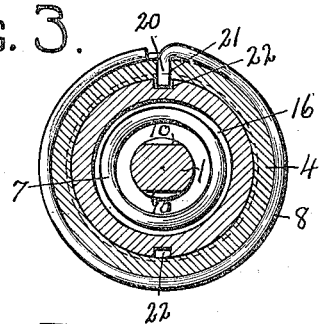
Figure 4:
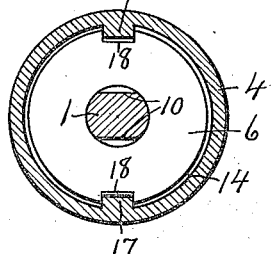
Figure 5:
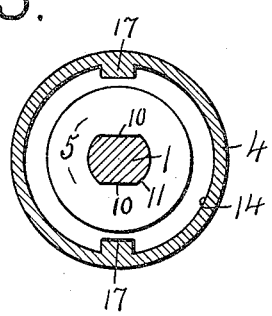

Figures 3, 4 and 5 are transverse sectional views taken respectively on lines 3—3, 4—4 and 5—5, Figure 2.

Figure 6:
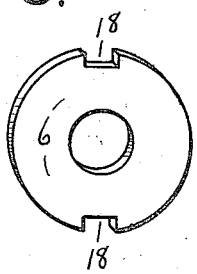
Figure 7:
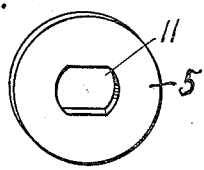

Figures 6 and 7 are perspective views of the friction discs shown in Figure 2.

The coupling as illustrated is adapted to transmit motion from a rotary driving shaft —1— to a coaxial driven shaft —2— and comprises a pair of coaxial cylindrical sections —3— and —4—, friction disks —5— and —6—, a coil spring —7— for exerting axial pressure between the disks —5— and —6—, and a locking ring —8—.

The driving shaft —1— extends through a central cylindrical opening —9— in the outer end of the coupling section —3— and is cylindrical except that the inner end thereof extending into the coupling section —4— is provided with opposite flattened parallel faces —10— for engaging in similarly formed central openings —11— in the friction disks —5— to cause said disks to rotate therewith while permitting relative axial movement of the disks and driving shaft.

The driven shaft —2— is secured by a set screw —12— in a central cylindrical opening —13— in the outer end of the coupling section —4— which is enlarged at its inner end to form a chamber —14— for the reception of the disks —5— and —6— and also to form a friction face or abutment —15— against which the outermost disk —6— is impinged in a manner presently described.

The coupling section —3— is also provided with an internal chamber —16— for the reception of the coil spring —7— which encircles the driving shaft —1— and has one end abutting against the outer end wall of the coupling section —3— and its inner end engaged with the adjacent friction washer —6— for the purpose of exerting axial pressure of the several friction washers one against the other.

The inner end of the coupling section —3— is threaded externally and engaged by the internally threaded adjacent end of the coupling section —4— to permit the section —3— to be adjusted axially of and upon the section —4— for varying the tension of the spring —7— and thereby varying the degree of friction between the disks —5— and —6— as may be required to cause the coupling to properly function when used in connection with motors of different powers or with different loads.

The coupling section —4— is provided with a plurality of, and in this instance two, internal longitudinally extending ribs —17— which enter peripheral recesses or notches —18— in the disks —6—, to cause the latter to rotate with the coupling sections while permitting relative axial movement between said disks and coupling section —4—.

The friction disks —5—, which are splined on the adjacent angular end of the driving shaft —1— in axially spaced relation, are preferably made of steel or other suitable metal and are of less diameter than that of the chamber —14— inside of the ribs —17—, so as to permit their free rotation in said chamber relatively to the section —4—.

The disks —6— are preferably made of fibre and are assembled in spaced relation within the coupling section —4— so as to alternate with the metal disks —5—, the interior diameters of said fibre disks being somewhat greater than that of the driving shaft —1— so as to allow their free rotation relatively to said driving shaft.

The locking member —8— consists of a split spring ring operatively seated in an annular groove —19— in the periphery of the coupling section —4—, which is engaged with the coupling section —3—, and has one end bent inwardly or radially to form a locking pin —20— which extends through a radial opening —21— in the coupling section —4— and is adapted to enter one or the other of a plurality of recesses —22— in the periphery of the coupling sections in their adjusted position against relative turning movement, or when it is desired to adjust those sections one upon the other, the end of the ring carrying the pin —20— may be sprung outwardly out of engagement with the recess —22—, to permit the section —3— to be screwed or unscrewed upon or from the section —4— or adjusted to any desired position within the range of the threaded portions of said coupling sections.

For example, assuming that the motor for driving the shaft —1— is selected to carry easily a certain maximum load actuated by the driven shaft —2— and that the spring —7— is adjusted to produce just sufficient friction between the disks —5— and —6— to move that load; then in case the load should exceed the predetermined degree, it is evident that the friction disks —5— and —6— would slip one upon the other, thereby stopping the driven shaft —2— while permitting the continuous operation of the motor shaft —1—.

On the other hand, if it should be found that the motor was capable of carrying a heavier load without liability of stalling, the friction between the disks —5— and —6— may be increased by simply adjusting the section —3— upon the section —4— to increase the tension of the spring —7—, and then relocking the sections —3— and —4— in their relatively adjusted positions by means of the locking ring —8—, it being understood that in case the driven shaft —2— should be stopped by overload, the coupling sections —3— and —4— and disks —6— would cease to rotate, while the motor shaft —1— and disks —5— would continue to rotate relatively to the sections —3— and —4— and disks —6—, in which case the spring —7— would also be at rest by reason of its engagement only with the section —3— and innermost disk —6—.

What I claim is:

1. The combination with coaxial shaft sections, the inner end of one section being flattened, of a coupling section secured to the other shaft section and provided with a socketed extension surrounding said flattened end and having internal lengthwise ribs, coaxial friction disks surrounding said flattened end and spring pressed toward the end wall of the socket, some of the disks being engaged with the ribs to rotate with said extension, the remaining disks being engaged with the flattened end to rotate therewith, and an additional coupling section having threaded telescopic connection with the first named coupling section for varying the tension of the spring and thereby varying the pressure of the disks against each other and against the end wall of the adjacent socket, the telescopic ends of the coupling sections being provided respectively with a peripheral notch, and a locking pin movable into and out of said notch for preventing and permitting relative rotation of the coupling sections.

2. A coupling of the character described, comprising relatively rotatable driving and driven coaxial shafts, a coupling member secured to the driven shaft and provided with a socketed end surrounding the adjacent end of the driving shaft, an additional coupling member loosely mounted on the driving shaft and provided with a socketed end in screw threaded engagement with the socketed end of the first named member, the adjacent ends of the coupling members being provided respectively with peripheral notches, and a locking pin movable into and out of said notches for preventing and permitting relative rotation of the coupling sections, a friction disk splined upon and within the socketed end of the first named member and frictionally engaged with the end wall of its socket, and an additional friction disk splined upon the inner end of the driving shaft and spring pressed into frictional engagement with the first named disk.

3. In a shaft coupling of the character described, the combination with coaxial driving and driven shaft sections, a coupling member having one end secured directly to one of the shaft sections and its other end socketed and surrounding the adjacent end of the other shaft section, an additional coupling member loosely surrounding the second named shaft section and having its inner end socketed and in threaded engagement with the socketed end of the first named coupling member, movable means releasable at will for holding the coupling members against relative rotation, a friction disk splined upon and within the socket of the first named coupling member and frictionally engaging the end wall of its socket, and an additional friction disk splined directly upon the inner end of the second named shaft section and spring pressed into engagement with the first named disk.

In witness whereof I have hereunto set my hand this 17th day of July, 1922.

MEAD HEDGLON.

Witnesses:
H. E. CHASE,
HOWARD P. DEINSON.